United States Patent
Zaitsev et al.

(10) Patent No.: US 6,270,737 B1
(45) Date of Patent: Aug. 7, 2001

(54) EXTRACTION PROCESSES AND SOLVENTS FOR RECOVERY OF CESIUM, STRONTIUM, RARE EARTH ELEMENTS, TECHNETIUM AND ACTINIDES FROM LIQUID RADIOACTIVE WASTE

(75) Inventors: Boris N. Zaitsev; Vyacheslav M. Esimantovskiy; Leonard N. Lazarev, all of St. Petersburg; Evgeniy G. Dzekun, Ozersk; Valeriy N. Romanovskiy, St. Petersburg, all of (RU); Terry A. Todd, Aberdeen, ID (US); Ken N. Brewer, Arco, ID (US); Ronald S. Herbst, Idaho Falls, ID (US); Jack D. Law, Pocatello, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/518,816

(22) Filed: Mar. 3, 2000

(30) Foreign Application Priority Data

Dec. 7, 1999 (RU) ................................................ 99125737

(51) Int. Cl.$^7$ ........................... C22B 60/02; C22B 26/00; C01F 17/00; C09K 3/00
(52) U.S. Cl. ............................ 423/8; 423/21.5; 423/157; 423/181; 252/184
(58) Field of Search .................................. 423/157, 181, 423/21.5, 8; 252/184

(56) References Cited

U.S. PATENT DOCUMENTS

| | | |
|---|---|---|
| 4,749,518 | 6/1988 | Davis, Jr. et al. . |
| 5,603,074 | 2/1997 | Miller et al. . |
| 5,666,641 | 9/1997 | Abney et al. . |
| 5,666,642 | 9/1997 | Hawthorne et al. . |
| 5,698,169 | 12/1997 | Hawthorne et al. . |

FOREIGN PATENT DOCUMENTS

1603552 * 7/1994 (SU) .

OTHER PUBLICATIONS

Smirnov, I. V. , "Recovery of Long–Lived Radionuclides from HLW by Extraction Mixtures on the Base of Cobalt-dicarbollyde and Phosphorylated Polyethelene Glycols", Spectrum '96, Seattle, WA, Proceedings American Nuclear Society, Inc., 1996, pp. 2115–2119, no month.

Smirnov, I. V. et al., "Combined Processing of HLW by Universal Solvent on the Base of Cobalt Dicarbollyde and Phosphorylated Polyethylene Glycol", Spectrum '98, Denver, CO, Proceedings American Nuclear Society, 1998, Inc., pp. 606–609, no month.

* cited by examiner

Primary Examiner—Steven Bos
(74) Attorney, Agent, or Firm—Virginia B. Caress; Paul A. Gottlieb

(57) ABSTRACT

Cesium and strontium are extracted from aqueous acidic radioactive waste containing rare earth elements, technetium and actinides, by contacting the waste with a composition of a complex organoboron compound and polyethylene glycol in an organofluorine diluent mixture. In a preferred embodiment the complex organoboron compound is chlorinated cobalt dicarbollide, the polyethylene glycol has the formula $RC_6H_4(OCH_2CH_2)_nOH$, and the organofluorine diluent is a mixture of bis-tetrafluoropropyl ether of diethylene glycol with at least one of bis-tetrafluoropropyl ether of ethylene glycol and bis-tetrafluoropropyl formal. The rare earths, technetium and the actinides (especially uranium, plutonium and americium), are extracted from the aqueous phase using a phosphine oxide in a hydrocarbon diluent, and reextracted from the resulting organic phase into an aqueous phase by using a suitable strip reagent.

26 Claims, 1 Drawing Sheet

EXTRACTION PROCESSES AND SOLVENTS FOR RECOVERY OF CESIUM, STRONTIUM, RARE EARTH ELEMENTS, TECHNETIUM AND ACTINIDES FROM LIQUID RADIOACTIVE WASTE

ACKNOWLEDGMENTS

This invention was made with government support under Contract No. DE-AC07-94ID13223 awarded by the Department of Energy to the Lockheed Idaho Technologies Company. The U.S. Government has certain rights in the invention.

FIELD OF THE INVENTION

The present invention relates generally to extraction agents and methods for selectively recovering cesium (Cs), strontium (Sr), technetium (Tc), rare earth elements, and actinides from aqueous acidic radioactive wastes. More specifically, the invention relates to extraction agent compositions comprising complex organoboron compounds and polyethylene glycol in an organofluorine diluent mixture, and phosphine oxide in a diluent. The invention also provides a method of using extracting and stripping agents to recover cesium, strontium, technetium, rare earth elements and actinides from acidic radioactive wastes.

BACKGROUND OF THE INVENTION

Liquid wastes from nuclear fuel reprocessing are extremely hazardous and expensive to store or dispose of Cesium-137, Strontium-90, actinides, transuranium elements (TRU), rare earth elements, and technetium, which are present in these wastes are of particular concern. The transuranium elements are typically alpha-emitters with very long half-lives, and cesium and strontium are the major heat generators of the waste and produce gamma and beta radiation. Technetium, as the pertechnetate ion, is very mobile in the environment and has an extremely long half life. To increase safe handling of the majority of the waste, and to significantly reduce the storage and/or disposal cost of the waste, it is desirable to partition the waste into two fractions. One containing the majority of the highly radioactive components, and one containing the bulk of the non-radioactive portion of the waste.

Nuclear waste exists in numerous forms and locations world-wide. The largest inventory of highly radioactive materials is produced from the reprocessing of spent nuclear fuel. The fission process produces a number of undesirable, highly-radioactive elements which accumulate in the nuclear fuel. For the reuse or recycling of the unused fissionable material left in the fuel, normally either uranium-235 or plutonium-239, a separation process is employed to partition the fissionable material from the undesirable fission products. This is normally accomplished by leaching or dissolution of a portion or all of the spent nuclear fuel material, followed by chemical separation. Early chemical separation processes were based on precipitation, where, for example, $BiPO_4$ was used to coprecipitate plutonium for weapons-grade plutonium production. More recently, and by far the most common, solvent extraction processes utilizing tri-n-butyl phosphate are used to chemically separate uranium and/or plutonium from solutions resulting from dissolution or leaching of spent nuclear fuel. The remaining acidic liquid waste, containing the highly radioactive fission products and trace transuranic elements, has been accumulated and stored in various forms around the world for the past 45 years.

Facilities in the United Kingdom, France, Japan, Russia, and China currently use the PUREX process (plutonium-uranium extraction) to recover and purify uranium and/or plutonium. The United States utilized this process (or variations of this process) for commercial-fuel reprocessing at the West Valley Plant, in upstate New York in the 1970's, and for reprocessing of weapons-grade plutonium at the Hanford Site in eastern Washington State, aluminum driver fuel at Savannah River Site in South Carolina, and naval fuel at the Idaho Chemical Processing Plant at the Idaho National Engineering and Environmental Laboratory (INEEL) in eastern Idaho. The reprocessing activities at Hanford were discontinued in the late 1980's and operations at Savannah River and the INEEL were discontinued in the early 1990's. There is currently no active nuclear fuel reprocessing facility in the United States.

There is however, a significant legacy of nuclear waste in storage from previous reprocessing activities. The majority of this waste was neutralized with caustic to facilitate storage in carbon steel vessels (Hanford and Savannah River). At the Idaho Chemical Processing Plant, this waste was calcined in a fluidized-bed calciner at 500° C., producing a granular solid. This solid calcine is stored in stainless steel bins inside concrete vaults. Currently about 4100 $m^3$ of highly radioactive calcine is stored at the INEEL, and about 1.2 million gallons of acidic liquid waste.

Currently, separate technologies are required for actinides and fission products, and often times, separate processes may be required for specific radionuclides such as cesium, strontium and technetium.

This invention describes novel extraction processes that will readily meet current safety standards and that will effectively separate the above-mentioned radioactive elements from typical nuclear reprocessing wastes. The liquid waste can be effectively decontaminated to meet low-level waste standards in two sequential solvent extraction processes.

U.S. Pat. No. 4,749,518 (Davis et al.) teaches a method for reprocessing nuclear waste by extracting cesium and strontium with crown compounds and cation exchangers.

U.S. Pat. No. 5,603,074 (Miller et al.) teaches a method of recovering cesium and strontium from an aqueous solution using a cobalt dicarbollide derivative.

U.S. Pat. No. 5,666,641 (Abney et al.) discloses a method of recovering cesium and strontium from an aqueous solution with polymeric materials and derivatives of cobalt dicarbollide.

U.S. Pat. Nos. 5,666,642 and 5,698, 169 (Hawthorne et al) teach the extraction of cesium and strontium ions from aqueous solutions, including fission product waste, using substituted metal dicarbollide ions.

To date, the known technologies have focused on recovering cesium and strontium from radioactive active wastes using various solvent systems, and have used the PUREX (plutonium uranium reduction and extraction) process for extracting actinides. However, past technologies have not provided for the selective sequential recovery of cesium, strontium, rare earth elements, technetium and actinides from aqueous acidic radioactive waste, using non-aromatic solvent extracting agents and non-hazardous stripping agents.

SUMMARY OF THE INVENTION

The present invention provides for the selective sequential recovery of cesium, strontium, technetium, rare earth elements and actinides from aqueous acidic radioactive waste, using non aromatic solvent extracting agents and non-hazardous stripping agents.

One embodiment of the invention relates to an extraction agent, for extracting cesium and strontium components from aqueous acidic radioactive waste, comprising a complex organoboron compound and a substituted or unsubstituted polyethylene glycol in an organofluorine diluent mixture.

Another embodiment of the invention relates to the method of selectively recovering cesium and strontium from aqueous acidic radioactive waste comprising:

(a) contacting the aqueous acidic radioactive waste with an extracting agent solution of a complex organoboron compound and a substituted or unsubstituted polyethylene glycol in an organofluorine diluent mixture, to extract cesium and strontium into an organic phase.

Within this embodiment is a method of stripping the cesium and strontium from the extracted organic phase of step (a) comprising:

(b) contacting the organic phase from step (a), containing cesium and strontium, with a strip reagent, such as a nitric acid solution of ammonium nitrate or a nitric acid solution of hexamethylenetetramine, to extract cesium and strontium from the organic phase of step (a), into an aqueous phase.

The Cs and Sr can then be processed by known high level waste (HLW) vitrification processes, or other processes of disposal known to those of skill in the art.

Another embodiment of this invention relates to the method of selectively recovering rare earth elements, technetium and actinides from aqueous acidic radioactive waste comprising:

(c) contacting the aqueous acidic phase from step (a), which contains the rare earth elements, the actinides including U, Pu and Am, technetium, and any other metals present, with an extracting solution of a phosphine oxide in a saturated hydrocarbon diluent, to extract rare earth elements, actinides and technetium into an organic phase.

Within this embodiment is a method of stripping the rare earth elements, technetium and actinides from the organic phase produced in step (c) comprising:

(d) contacting the organic phase from step (c), containing the rare earth elements, technetium and actinides with a strip reagent, such as a solution of ammonium carbonate or ammonium bicarbonate and a complexing agent such as EDTA or DTPA, to extract the rare earth elements, technetium and actinides into an aqueous phase.

The radionuclides in the aqueous phase can then be recovered or disposed of by vitrification or other methods known by those of skill in the art. The organic phase produced from this step can be recycled back to step (c).

Another embodiment of this invention relates to a method for processing liquid radioactive waste and recovering cesium, strontium, rare earth elements, technetium and actinides, especially U, Pu and Am, comprising the steps of:

(a) contacting the aqueous acidic radioactive waste with an extracting agent solution of a complex organoboron compound and a substituted or unsubstituted polyethylene glycol in an organofluorine diluent mixture, to extract cesium and strontium into an organic phase, and leaving the rare earth elements, actinides and technetium in the aqueous phase;

(b) contacting the organic phase from step (a), containing cesium and strontium, with a strip reagent, such as a nitric acid solution of ammonium nitrate or a nitric acid solution of hexamethylenetetramine, to strip cesium and strontium from the extracted organic phase into an aqueous phase;

(c) contacting the aqueous phase from step (a) with an extracting agent solution of a phosphine oxide in a saturated hydrocarbon diluent, to extract rare earth elements, actinides especially U, Pu and Am, and Tc, into an organic phase;

(d) contacting the organic phase from step (c) containing rare earth elements, actinides and technetium, with a strip reagent such as a solution of ammonium carbonate or ammonium bicarbonate and a complexing agent, to strip the rare earth elements, actinides and strontium into an aqueous phase;

(e) recovering or disposing of the actinides, especially U, Pu and Am, and Tc, from the aqueous phase of step (d), and (f) optionally recycling the organic phase from steps (b) and (d) back to the aqueous phases formed in steps (a) and (c) respectively.

The Cs and Sr extracted into an aqueous phase in step (b) may be recovered or disposed of by methods known to those skilled in the art.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

Figure 1:
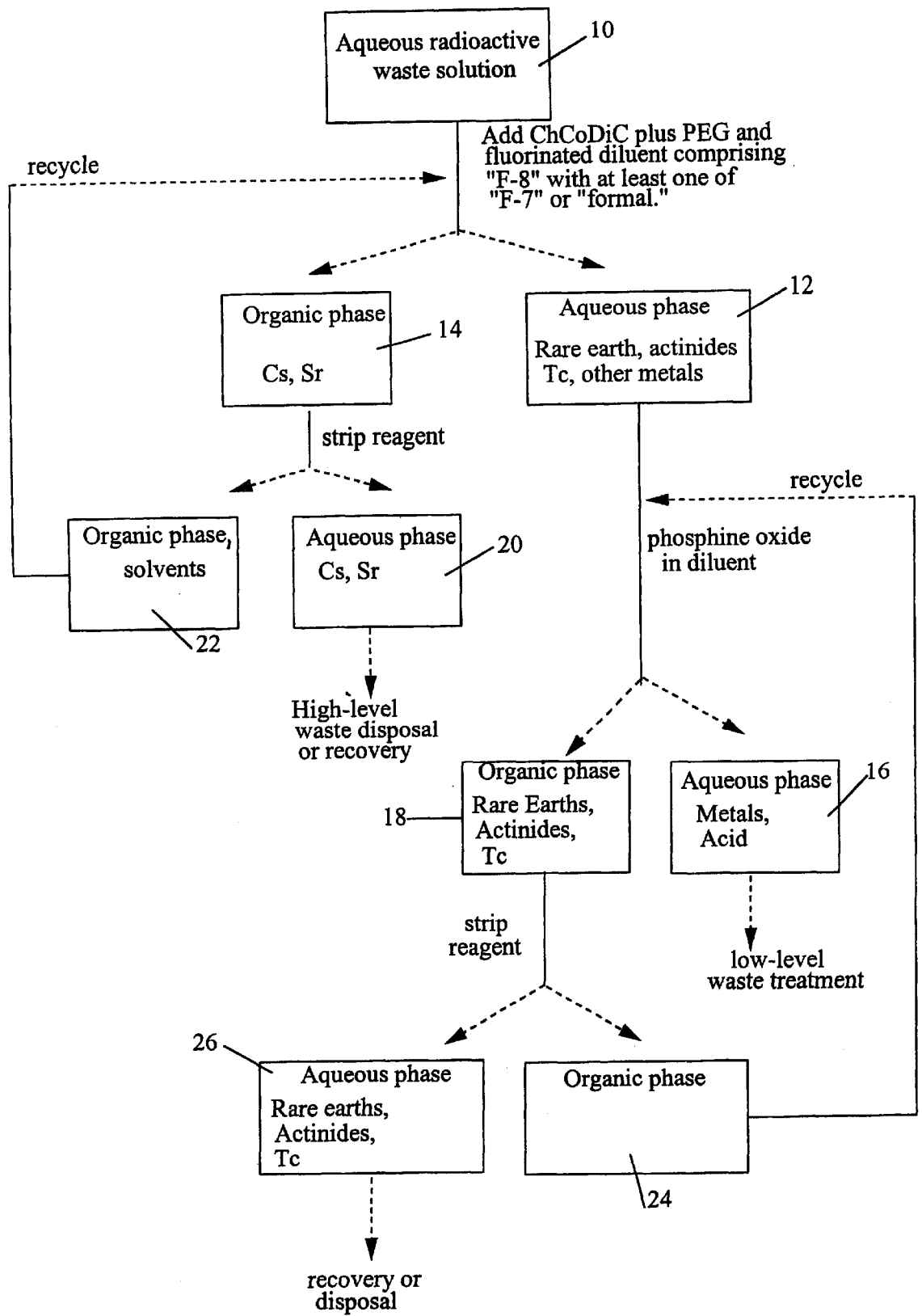
FIG. 1 is a flowchart of radioactive waste solution processing depicting in simplified form the separation and recovery/disposal of cesium and strontium, and the separation and recovery/disposal of all actinides and technetium using the phosphine oxide solution, and strip reagents. In actual practice, for a large scale operation, the extracting would be carried out in a countercurrent process, known to those of ordinary skill in the art.

The present invention may be understood more readily by reference to the following detailed description of preferred embodiments of the invention and the Examples included therein and to the Figures and their previous and following description.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, reference to "a pharmaceutical carrier" includes mixtures of two or more such carriers, and the like.

Ranges are often expressed herein as from "about" one particular value, and/or to "about" another particular value.

When such a range is expressed, another embodiment includes from the one particular value and/or to the other particular value. Similarly, when values are expressed as approximations, by use of the antecedent "about," it will be understood that the particular value forms another embodiment.

In this specification and in the claims which follow, reference will be made to a number of terms which shall be defined to have the following meanings:

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain from 1 to 12 carbon atoms. The term "lower alkyl" intends an alkyl group of from one to six carbon atoms, preferably from one to four carbon atoms.

The term aryl and substituted aryl refers to aromatic rings, e.g., phenyl, substituted phenyl and the like as well as rings which are fused, e.g., naphthyl, phenanthrenyl and the like. An aryl group thus contains at least one ring having at least 6 atoms, with up to five such rings being present, containing up to 22 atoms therein, with alternating (resonating) double bonds between adjacent carbon atoms or suitable heteroatoms. The preferred aryl groups are phenyl, naphthyl, and phenanthrenyl. Aryl groups may likewise be substituted as defined.

Optional or optionally means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

The term rare earth elements refers to the lanthanide series of elements which include lanthanum, cerium, praseodymium, neodymium, promethium, samarium, europium, gadolinium, terbium, dysprosium, holmium, erbium, thulium, ytterbium and lutetium.

The term actinides refers to the group of radioactive elements which include actinium, thorium, protoactinium, uranium, neptunium, plutonium, americium, cerium, berkelium, californium, einsteinium, fermium, mendelevium, nobelium and lawrencium.

The term transuranium refers to a radioactive element having a higher atomic number than uranium, not found naturally, and produced by nuclear bombardment.

The term halogen and halogenated refer to bromine, chlorine, fluorine and iodine.

The term normal paraffin refers to saturated hydrocarbons characterized by a single unbranched chain of carbon atoms, usually indicated by the prefix n-.

One embodiment of the invention relates to an extraction agent for extracting cesium and strontium components in aqueous acidic radioactive waste comprising a complex organoboron compound and a substituted or unsubstituted polyethylene glycol in an organofluorine diluent mixture.

Within this embodiment, a particular complex organoboron compound is cobalt dicarbollide of the formula (Co $C_2B_9H_{11}$)$_2$. More preferred is a halogenated cobalt dicarbollide. Even more preferred is a chlorinated cobalt dicarbollide.

The organofluorine diluent mixture is a mixture of bis-tetrafluoropropyl ether of diethylene glycol ("F-8") with bis-tetrafluoropropyl ether of ethylene glycol ("F-7"), or a mixture of F-8 with bis-tetrafluoropropyl formal, or a mixture of F-8 with both F-7 and the bis-tetrafluoropropyl formal. Formulas for the organofluorine diluents are as follows:

bis-tetrafluoropropyl ether of diethylene glycol, ("F-8")

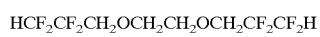

bis-tetrafluoropropyl ether of ethylene glycol, ("F-7")

bis-tetrafluoropropyl formal, ("formal")

It is preferred that the substituted polyethylene glycol have the formula:

wherein n is 5–12; and R is a hydronium ion, aryl, substituted aryl, or alkyl. Preferably, n is 7–10 and R is a straight-chain alkyl with 9 carbon atoms.

A preferred phosphine oxide "POR" in this embodiment has the formula:

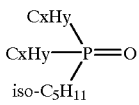

where —$C_xH_y$, x is 7–9 and y is 15–19. The alkyl radical —$C_xH_y$ can be —$C_7H_{15}$, —$C_8H_{17}$, or —$C_9H_{19}$ in all possible combinations thereof. A preferred hydrocarbon diluent in this embodiment is dodecane. Other suitable diluents are $C_{10}$–$C_{15}$ saturated hydrocarbons, used singly or mixtures thereof.

Another embodiment of this invention relates to a method for selectively recovering cesium, strontium, rare earth elements, technetium and actinides, especially U, Pu, and Am from aqueous acidic radioactive waste. The method of the invention can best be understood with reference to the flowchart, FIG. 1. The method comprises the steps of:

(a) contacting an aqueous acidic radioactive waste solution 10 with an extracting agent solution comprising a complex organoboron compound and a substituted or unsubstituted polyethylene glycol in an organofluorine diluent mixture, to form an aqueous phase 12 and an organic phase 14, wherein cesium and strontium are extracted into the organic phase 14;

(b) contacting the organic phase 14 from step (a), containing cesium and strontium, with a strip reagent solution, for example a nitric acid solution of ammonium nitrate or a nitric acid solution of hexamethylenetetramine, wherein cesium and strontium are extracted into an aqueous phase 20;

(c) contacting the aqueous phase 12 from step (a) with an extracting agent solution comprising a phosphine oxide in a saturated hydrocarbon diluent, to form an aqueous phase 16, which contains acids and some metals which may have been in the radioactive waste, and an organic phase 18 containing the rare earth elements, the actinides and technetium;

(d) contacting the organic phase 18 containing the rare earth elements, the actinides and technetium with a strip reagent, for example a solution of ammonium carbonate or ammonium bicarbonate and a complexing agent such as EDTA or DTPA, to form an aqueous phase 26 containing the rare earth elements, the actinides and technetium.

(e) recovering the rare earths elements, the actinides and the technetium, or disposing of them by solidification methods, known to those of skill in the art.

The Cs and Sr in the aqueous phase 20 can be recovered or disposed of by high-level waste disposal methods known to those of skill in the art. Optionally the organic phases 22 and 24 can be recycled as shown in FIG. 1.

Within this embodiment, it is preferred that the aqueous acidic waste has a nitric acid content of from about 0.1 M to about 3 M, most preferably 0.1–2 M, and nitrate ions of up to about 4 M.

A preferred step in this embodiment comprises diluting the concentration of the aqueous acidic waste with water, prior to step (a), to a concentration of about 1.5 M to about 1.2 M.

A preferred substituted polyethylene glycol has the formula:

wherein n is 5–12; and R is a hydronium ion, aryl, substituted aryl, or alkyl. More preferably, n is 7–10 and R is a straight-chain saturated alkyl with 9 carbon atoms.

A particular complex organoboron compound in this embodiment is cobalt dicarbollide. More preferred is a halogenated cobalt dicarbollide. Even more preferred is chlorine cobalt dicarbollide.

The preferred organofluorine diluent is a mixture of bis-tetrafluoropropyl ether of diethylene glycol ("F-8") with bis-tetrafluoropropyl ether of ethylene glycol ("F-7"), or a mixture of "F-8" with bis-tetrafluoropropyl formal ("formal"), or F-8 with both F-7 and the formal. The ratio of the mixture is 40–60% by volume F-8, with 60–40% of the other one or two components.

The preferred phosphine oxide in this embodiment has the formula:

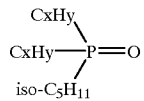

where x is 7–9 and y is 15–19. The alkyl radical —$C_xH_y$ can be —$C_7H_{15}$, —$C_8H_{17}$, or —$C_9H_{19}$ in all possible combinations thereof. The phosphine oxide solution is added to give a final concentration of 5–40% in the diluent, preferably 30–40% by volume.

The preferred hydrocarbon diluent used with the phosphine oxide is dodecane. Other suitable hydrocarbon diluents are saturated hydrocarbons containing 10–15 carbon atoms.

Preferred complexing agents which are used with ammonium carbonate or ammonium bicarbonate for stripping rare earth elements, actinides and technetium are ethylenediamine tetraacetic acid (EDTA) or diethylenetriamine pentaacetic acid (DTPA).

EXAMPLES

The following examples are put forth so as to provide those of ordinary skill in the art with a complete disclosure and description of the compositions and methods claimed herein, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at room temperature, and pressure is at or near atmospheric.

The cobalt dicarbollide can be purchased as the cesium salt, from Katchem, Ltd., El Krasnohorske 6, 1100 00 Prague 1, Czech Republic. To produce chlorinated cobalt dicarbollide (CCD), the cesium salt of CCD is dissolved in diluent (e.g. phenyltrifluoromethyl sulfone), typically 1 gram CCD per 10 ml of diluent. The CCD/diluent mixture is then contacted with an equal volume of 8–10 M $HNO_3$ for 3–5 minutes. The two phases are then separated and the CCD/diluent mixture is again contacted with fresh 8–10 M $HNO_3$. This procedure is repeated 3–4 times then the solvent mixture is contacted with excess (typically 5 times organic vol.) 0.1 M $HNO_3$, to produce the CCD.

The polyethylene glycols can be obtained from several companies including Union Carbide Corp., 39 Old Ridgebury Rd., Danbury, Conn. 06817-001.

The organofluorine diluent bis-tetrafluoropropyl ether of ethylene glycol ("F-7") is not commercially available but can be made according to a procedure by A. L. Krylov et al., *Mendeleev All-Union Chemical Society Journal*, v. 22, pp. 469–470 (1977). The diluent F-8 can also be made according to the Krylov et al. procedure. Bis-tetrafluoropropyl formal can be made by the method disclosed in U.S. Pat. No. 3,526,667 (M. E. Hill and K. J. Shipp).

The various phosphine oxides "POR" can be made according to several known methods. One suitable method is the following: (1) alkylation of red phosphorous with alkyl iodides in the presence of a catalytic amount of iodine to form a complex $R_3PI_2I$; (2) decomposition of the complex by heating and slow addition of the corresponding monohydric alkyl alcohol to produce the complex $R_3POI$; (3) the $R_3POI$ complex is treated with benzene and sodium sulfite to produce the phosphine oxides.

Ammonium nitrate, hexamethylene tetramine, EDTA and DTPA are commercially available from a number of companies, such as Aldrich Chemical Co., Inc., 940 West Saint Paul Ave., Milwaukee, Wis. 53233.

Extraction of Cesium and Strontium

Example 1

A solution of chlorinated cobalt dicarbollide("ChCoDiC") in an organic diluent comprised of bis-tetrafluoropropyl ether of diethylene glycol (F-8), or its mixture with a polyfluorinated ether, was contacted with the aqueous acid solution containing cesium nitrate at 20° C. for three minutes. Standard procedures for radiometric determination of the distribution coefficients (D) were used. D=concentration in organic phase/concentration in aqueous phase. From the results in Table 1 it can be seen that the addition of a second diluent leads to a greatly desired increase of the cesium distribution coefficient as compared with F-8 alone.

Example 2

A solution of ChCoDiC and a substituted polyethylene glycol in an organic diluent comprised of bis-tetrafluoropropyl ether of diethylene glycol (F-8), or its mixture with a polyfluorinated ether, was contacted with an aqueous acid solution containing strontium nitrate at 20° C. for 3 minutes. Standard procedures for radiometric determination of distribution coefficients were used. Results are shown in Table 1. From the results in Table 1 it can be seen that in general the addition of the second diluent leads to the increase of the strontium distribution coefficient as compared with pure F-8.

Example 3

A solution of ChCoDiC and a substituted polyethylene glycol in an organic diluent comprised of a mixture of bis-tetrafluoropropyl ether of diethylene glycol (F-8) and bis-tetrafluoropropyl ether of ethylene glycol (F-7) was contacted with a solution simulating typical high-level radioactive waste for 3 minutes at 20° C. Standard procedures for radiometric determination of distribution coefficients were used. Results are Shown in Table 1. It was determined that when the ChCoDiC content is above 0.1M and the substituted polyethylene glycol content is above 20 g/l, a 99.5% recovery of cesium and strontium can be reached on 10–12 stages of a countercurrent extraction process.

TABLE 1

Cesium and Strontium Distribution Coefficients Composition of Solution

| Diluent | ChCoDiC, M/l | PEG*, g/l | Aq. Phase | Cs | Sr |
|---|---|---|---|---|---|
| F-8** | 0.15 | 30 | 3M/l HNO$_3$ | 0.7 | 1.3 |
| F-8:formal# 50:50 v/v | 0.15 | — | 3M/l HNO$_3$ | 1.90 | <10$^{-2}$ |
| F-8:formal 50:50 v/v | 0.15 | 30 | 3M/l HNO$_3$ | 1.26 | 2.6 |
| F-8:formal 60:40 v/v | 0.15 | — | 3M/l HNO$_3$ | 1.55 | <10$^{-2}$ |
| F-8:formal 60:40 v/v | 0.15 | 30 | 3M/l HNO$_3$ | 1.05 | 2.2 |
| F-8:formal 60:40 v/v | 0.15 | 30 | Typical Simulated Radwaste | 0.61 | 0.7 |
| F-8:F7*** 50:50 v/v | 0.15 | 30 | Typical Simulated Radwaste | 1.0 | 0.9 |
| F-8:F-7 40:60 v/v | 0.15 | 30 | 3M/l HNO$_3$ | 1.55 | 3.4 |
| F-8:F-7 40:60 v/v | 0.15 | 30 | Typical Simulated Radwaste | 1.16 | 1.2 |
| F-8:F-7 40:60 v/v | 0.15 | 30 | 3M/l NH$_4$NO$_3$+ 1M/l HNO$_3$ (stripping reagent) | 0.5 | 0.15 |

HCF$_2$CF$_2$CH$_2$OCH$_2$CH$_2$OCH$_2$CH$_2$OCH$_2$CF$_2$CF$_2$H = F-8
HCF$_2$CF$_2$CH$_2$OCH$_2$CH$_2$OCH$_2$CF$_2$CF$_2$H = F-7
HCF$_2$CF$_2$CH$_2$OCH$_2$OCH$_2$CF$_2$CF$_2$H = formal
*indicates substituted polyethylene glycol TABLE 1-continued Cesium and Strontium Distribution Coefficients Composition of Solution

| Diluent | ChCoDiC, M/l | PEG*, g/l | Aq. Phase | Cs | Sr |
|---|---|---|---|---|---|

**F-8 is bis-tetrafluoropropyl ether of diethylene glycol.
***F-7 is bis-tetrafluoropropyl ether of ethylene glycol
formal is bis-tetrafluoropropyl formal
Radwaste is the abbreviation for radioactive waste
The last row, D$_{Cs}$ = 0.5 and D$_{Sr}$ = 0.15, is the stripping reagent for Cs and Sr.

Extraction of Rare Earth Elements, Actinides and Technetium

Example 4

A solution of phosphine oxides (POR) of the formula:

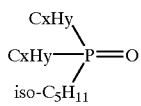

(where for the —C$_x$H$_y$, x=7–9, and y=15–19), with a concentration of 5–40%, was contacted with an aqueous solution containing rare earth elements, actinides and technetium. In this example the —C$_x$H$_y$ was a mixture of —C$_7$H$_{15}$, —C$_8$H$_{17}$, and —C$_9$H$_{19}$ in various combinations. The results are shown in Tables 2–4 below. The distribution coefficient for Europium was measured as a surrogate for Americium.

TABLE 2

Europium (Americium) Distribution Coefficients for POR

| | HNO$_3$ Conc. (M/L) | | | | | |
|---|---|---|---|---|---|---|
| % POR | 0.05 | 0.1 | 0.3 | 1.0 | 2.0 | 3.0 |
| 5% POR | 0.47 | 1.9 | 2.2 | 1.1 | 0.19 | 0.06 |
| 10% POR | 0.83 | 6.0 | 9.0 | 2.4 | 0.72 | 0.27 |
| 20% POR | 1.0 | 23 | 35 | 9.3 | 1.8 | 0.59 |
| 40% POR | 6.2 | 46 | 54 | 15 | — | 1.8 |

TABLE 3

Actinide Distribution Coefficients for 5% POR

| | HNO$_3$ Conc. (M/L) | | | | |
|---|---|---|---|---|---|
| | 0.05 | 0.1 | 0.3 | 1.0 | 3.2 |
| Uranium | 580 | 1700 | 4100 | 3600 | 180 |
| Plutonium | 20 | 17 | 15 | 12 | 10 |

TABLE 4

Technetium Distribution Coefficients for 20% POR

| | HNO$_3$ Conc. (M/L) | | | | |
|---|---|---|---|---|---|
| | 0.5 | 1.0 | 1.5 | 4.5 | 5.0 |
| Tc | >20 | 20 | 97 | 1.1 | 0.69 |

Example 5

Stripping Reagent for Actinides, Rare Earths, Tc

Ammonium bicarbonate (or carbonate) alone will effectively remove U but will not effectively extract Pu into the aqueous phase. Under the conditions as shown in Table 5, the plutonium distribution coefficient is 10–20, whereas a desirable D would be less than 1.

TABLE 5

| Uranium Distribution Coefficients for 20% POR | | | | | | |
|---|---|---|---|---|---|---|
| Reextractant | 10% NH$_4$HCO$_3$ | | | 20% NH$_4$HCO$_3$ | | |
| Vorg/Vaq | 1:1 | 2:1 | 4:1 | 2:1 | 4:1 | 6:1 |
| D Uranium | 0.006 | 0.007 | 90 | 0.07 | 0.12 | 1.2 |

The addition of a complexing agent (EDTA or DTPA) into the ammonium bicarbonate strip reagent eliminates the formation of precipitates and also provides for the complete stripping of plutonium (distribution coefficient D<0.1), other actinides and Tc.

The novel extracting diluents and stripping agents have been further tested on pilot-scale equipment using actual waste solutions. The pilot-scale test confirmed that cesium and strontium decontamination factors necessary for U.S. low-level waste are achievable. Up to 99.5% recovery of Cs and Sr, and 99.5% recovery of the actinides has been achieved using the extractants and methods of the invention.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An extraction agent for extracting cesium, strontium, rare earths, actinides and technetium in an aqueous liquid radioactive waste comprising a complex organoboron compound and a substituted or unsubstituted polyethylene glycol in an organofluorine diluent mixture, said organofluorine diluent mixture comprising bis-tetrafluoropropyl ether of diethylene glycol with a at least one of bis-tetrafluoropropyl ether of glycol and bis-tetrafluoropropyl formal.

2. The extraction agent of claim 1 wherein the complex organoboron compound is cobalt dicarbollide.

3. The extraction agent of claim 2 wherein the cobalt dicarbollide is a halogenated cobalt dicarbollide.

4. The extraction agent of claim 3 wherein the cobalt dicarbollide is a chlorinated cobalt dicarbollide.

5. The extraction agent of claim 1 wherein the substituted polyethylene glycol has the formula:

RC$_6$H$_4$(OCH$_2$CH$_2$)$_n$OH, wherein n=5 to 12; and
R=a hydronium ion, aryl, substituted aryl or alkyl.

6. The extraction agent of claim 5 wherein n is 7–10.

7. The extraction agent of claim 6 wherein R is a straight chain alkyl group with 9 carbon atoms.

8. The extraction agent of claim 1 wherein said bis-tetrafluoropropyl ether of diethylene glycol has the formula:

HCF$_2$CF$_2$CH$_2$OCH$_2$CH$_2$OCH$_2$CH$_2$OCH$_2$CF$_2$CF$_2$H, said bis-tetrafluoropropyl ether of ethylene glycol has the formula:

HCF$_2$CF$_2$CH$_2$OCH$_2$CH$_2$OCH$_2$CF$_2$CF$_2$H, and said bis-tetrafluoropropyl ether of ethylene glycol has the formula:

HCF$_2$CF$_2$CH$_2$OCH$_2$OCH$_2$CF$_2$CF$_2$H.

9. A method for selectively recovering cesium and strontium from aqueous acidic radioactive waste comprising:
   (a) contacting an extracting agent solution of a complex organoboron compound and a substituted or unsubstituted polyethylene glycol in an organofluorine diluent mixture, said mixture comprising bis-tetrafluoropropyl ether of diethylene glycol with at least one of bis-tetrafluoropropyl ether of ethylene glycol and bis-tetrafluoropropyl formal, with the aqueous acidic radioactive waste to extract cesium and strontium into an organic phase, and leaving rare earths, actinides and technetium in an aqueous phase.

10. The method of claim 9 further comprising:
   (b) contacting the organic phase from stop (a), said organic phase containing cesium and strontium, with a nitric acid solution of ammonium nitrate or a nitric acid solution of hexamethylenetetramine, to strip the cesium and strontium from the organic phase into an aqueous phase.

11. The method of claim 9 further comprising recovering rare earth elements, actinides and technetium, from aqueous acidic radioactive waste comprising:
   (c) contacting the aqueous phase from step (a) with an extracting solution of a phosphine oxide in a saturated hydrocarbon diluent, to extract rare earth elements, actinides and technetium into an organic phase.

12. The method of claim 11 wherein the phosphine oxide has the formula:

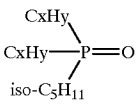

where x is 7–9 and y is 15–19.

13. The method of claim 11 further comprising:
   (d) contacting the organic phase formed in step (c), containing rare earth elements, actinides, and technetium, with a solution of ammonium bicarbonate or ammonium carbonate, and a complexing agent to strip the rare earth elements, actinides and technetium into an aqueous phase.

14. A method for selectively recovering cesium, strontium, rare earth elements, actinides and technetium from aqueous acidic radioactive waste comprising the steps of:
   (a) contacting the aqueous acidic radioactive waste with an extracting agent solution of a complex organoboron compound and a substituted or unsubstituted polyethylene glycol in an organofluorine diluent mixture, to extract cesium and strontium into an organic phase, and leaving the rare earth elements, actinides and technetium in an aqueous phase;

(b) contacting the organic phase from step (a), containing cesium and strontium, with a strip reagent to strip cesium and strontium from the extracted organic phase into an aqueous phase;

(c) contacting the aqueous phase from step (a) with an extracting agent solution of a phosphine oxide in a saturated hydrocarbon diluent, to extract rare earth elements, actinides and technetium, into an organic phase; and (d) contacting the organic phase from step (c) containing rare earth elements, actinides and technetium, with a strip reagent to strip the rare earth elements, actinides and strontium into an aqueous phase.

15. The method of claim 14 wherein the aqueous acidic radioactive waste has a nitric acid content of from about 0.1 to about 2M and nitrate ions of up to about 4M.

16. The method of claim 14 wherein the complex organoboron compound is cobalt dicarbollide.

17. The method of claim 16 wherein the cobalt dicarbollide is a halogenated cobalt dicarbollide.

18. The method of claim 17 wherein the cobalt dicarbollide is chlorine cobalt dicarbollide.

19. The method of claim 14 wherein said organofluorine diluent is a mixture of bis-tetrafluoropropyl ether of diethylene glycol with at least one of bis-tetrafluoropropyl ether of ethylene glycol and bis-tetrafluoropropyl formal.

20. The method of claim 19 wherein the volume ratio of the bis-tetrafluoropropyl ether of diethylene glycol to the other components in the mixture is from about 40% to about 60%.

21. The method of claim 14 wherein said phosphine oxide has the formula:

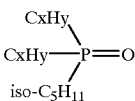

where x=7–9, and y=15–19.

22. The method of claim 21 wherein the final concentration of the phosphine oxide in the diluent is 5–40% by volume.

23. The method of claim 14 wherein said saturated hydrocarbon diluent is dodecane.

24. The method of claim 14 wherein the substituted polyethylene glycol has the formula:

wherein n is 5 to 12; and R is a hydronium ion, aryl, substituted aryl or alkyl.

25. The method of claim 24 wherein n is 7–10.

26. The method of claim 19 wherein said bis-tetrafluoropropyl ether of diethylene glycol has the formula:

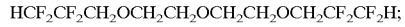

said bis-tetrafluoropropyl ether of ethylene glycol has the formula:

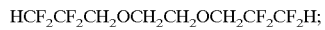

and said bis-tetrafluoropropyl formal has the formula:

* * * * *